United States Patent [19]

Tanahashi et al.

[11] 4,183,343
[45] Jan. 15, 1980

[54] INTERNAL COMBUSTION ENGINE AND A METHOD OF OPERATING AN INTERNAL COMBUSTION ENGINE

[75] Inventors: Toshio Tanahashi; Yoshiharu Sakai, both of Toyota, Japan

[73] Assignee: Toyota Jidosha Kogyo Kabushiki Kaisha, Aichi, Japan

[21] Appl. No.: 789,237

[22] Filed: Apr. 20, 1977

[30] Foreign Application Priority Data

Mar. 1, 1977 [JP] Japan .................................. 52/20823

[51] Int. Cl.$^2$ ........................... F02B 23/00; F02B 3/00
[52] U.S. Cl. ............................... 123/191 S; 123/75 B; 123/32 SP; 123/193 H; 123/193 P; 123/32 L
[58] Field of Search ............ 123/75 B, 191 S, 191 SP, 123/32 SP, 32 ST, 193 P, 193 CP, 193 C, 193 H, 32 L, 32 K

[56] References Cited

U.S. PATENT DOCUMENTS

| | | | |
|---|---|---|---|
| 4,034,733 | 7/1977 | Noguchi | 123/191 SP |
| 4,038,959 | 8/1977 | Takizawa | 123/191 SP |
| 4,058,090 | 11/1977 | Suzuki | 123/191 S |
| 4,080,938 | 3/1978 | Noguchi et al. | 123/75 B |
| 4,084,551 | 4/1978 | Noguchi et al. | 123/75 B |
| 4,085,713 | 4/1978 | Noguchi et al. | 123/75 B |

*Primary Examiner*—Ronald H. Lazarus
*Attorney, Agent, or Firm*—Stevens, Davis, Miller & Mosher

[57] ABSTRACT

Disclosed is an internal combustion engine having a combustion chamber. A squish area is formed in the combustion chamber between the peripheral portion of the inner surface of the cylinder head and the peripheral portion of the top surface of the piston. The combustible mixture located within the squish area is ignited and, as the result, a combustion gas is injected into the combustion chamber from the squish area. This combustion gas causes a turbulent burning of the combustible mixture in the combustion chamber.

6 Claims, 9 Drawing Figures

INTERNAL COMBUSTION ENGINE AND A METHOD OF OPERATING AN INTERNAL COMBUSTION ENGINE

DESCRIPTION OF THE INVENTION

The present invention relates to a method of operating an internal combustion engine and to a combustion chamber of an internal combustion engine.

As a method for effectively reducing the amount of harmful HC, CO and $NO_x$ components in the exhaust gas, there has been known a method of using a lean air-fuel mixture. However, since the flame speed of a lean air-fuel mixture is very slow, the combustion speed is slow, thus resulting in a problem in that a stable combustion can not be obtained. On the other hand, as a method for effectively reducing the amount of harmful $NO_x$ components in the exhaust gas, there has been known a method of recirculating a large amount of exhaust gas into the intake system of the engine. However, in a conventional engine, since the recirculated exhaust gas is not fully mixed with the air-fuel mixture in the combustion chamber, a sufficient reduction of the amount of $NO_x$ can not be obtained and, at the same time, a stable combustion can not be obtained. Consequently, in an internal combustion engine having no auxiliary combustion chamber, it is difficult to obtain a stable combustion by using a lean air-fuel mixture or an air-fuel mixture containing a large amount of recirculated exhaust gas therein.

As an internal combustion engine capable of using a lean air-fuel mixture or an air-fuel mixture containing a large amount of recirculated exhaust gas therein, there has been known an internal combustion engine in which its combustion chamber comprises a main combustion chamber and an auxiliary combustion chamber interconnected by a connecting passage with each other, and a spark plug is disposed in the connecting passage or in the auxiliary combustion chamber at a position near the connecting passage. In this engine, at the time of the intake stroke, a combustible mixture is introduced into the main combustion chamber. Then, at the time of the compression stroke, the combustible mixture is forced into the auxiliary combustion chamber via the connecting passage. After this, the combustible mixture in the auxiliary combustion chamber is ignited by the spark plug and, then, a burning jet is injected into the main combustion chamber from the connecting passage. The combustible mixture in the main combustion chamber is burned by the burning jet.

In an internal combustion engine of this type, since the residual exhaust gas created by the combustion in the preceding cycle and remaining around the electrode of the spark plug is fully scavenged by the combustible mixture forced into the auxiliary combustion chamber via the connecting passage at the time of the compression stroke, even if a lean air-fuel mixture or an air-fuel mixture containing recirculated exhaust gas therein is used, easy ignition can be obtained. In addition, a turbulent burning is caused by the burning jet in the main combustion chamber and, as a result, the speed of combustion is quickened, thus obtaining a stable combustion.

However, in an internal combustion engine of the above-mentioned type, a satisfactory combustion speed can not be obtained, particularly when the engine is operating under a heavy load. As one of the methods for quickening the combustion speed, there is a method of further strengthening the burning jet, for example, by increasing the ratio of the volume of the auxiliary combustion chamber to the volume of the main combustion chamber. However, the increase in the above-mentioned ratio brings about an increase in the amount of the combustible mixture forced into the auxiliary combustion chamber via the connecting passage, that is, via the restricted opening, by the piston at the time of the compression stroke. This results in increasing the work load necessary to force the combustible mixture into the auxiliary combustion chamber by the piston, thus causing a problem in that the output power of the engine is considerably reduced.

An object of the present invention is to provide an internal combustion engine capable of quickening the combustion speed of a lean air-fuel mixture or of an air-fuel mixture containing a large amount of recirculated exhaust gas therein, and to provide a method for quickening the combustion speed of such a combustible mixture.

According to the present invention, there is provided a method of operating an internal combustion spark ignition engine comprising a cylinder, a cylinder head, and a reciprocal piston disposed in said cylinder and having a top surface, said piston and said cylinder head defining a combustion chamber therebetween, said cylinder head having an inner surface portion which approaches the vicinity of the top surface of said piston and forms a squish area between said inner surface portion and the top surface of said piston when said piston reaches the top dead center, said method comprising the steps of: introducing a combustible mixture into said combustion chamber; compressing the combustible mixture in said combustion chamber; igniting the combustible mixture located within said squish area by an ignition source; causing a flame of the combustion mixture to propagate over the entire space of said squish area; and, injecting a burning jet towards said combustion chamber from said squish area to cause the turbulent burning of the combustible mixture in said combustion chamber.

In addition, according to the present invention, there is provided an internal combustion engine comprising: a cylinder block having a cylinder bore therein; a piston reciprocally movable in said cylinder bore and having a top surface; a cylinder head mounted on said cylinder block and having an inner surface portion which approaches the vicinity of the top surface of said piston and forms a squish area between said inner surface portion and the top surface of said piston when said piston reaches the top dead center, said piston and said cylinder head defining a combustion chamber; an intake valve movably mounted on said cylinder head for leading a combustible mixture into said combustion chamber; an exhaust valve movably mounted on said cylinder head for discharging an exhaust gas into the atmosphere; and, ignition means for igniting the combustible mixture located within said squish area to inject a burning jet from said squish area towards said combustion chamber.

The present invention may be more fully understood from the description set forth below of preferred embodiments of the invention, together with the accompanying drawings.

DESCRIPTION OF PREFERRED EMBODIMENTS

Figure 1:
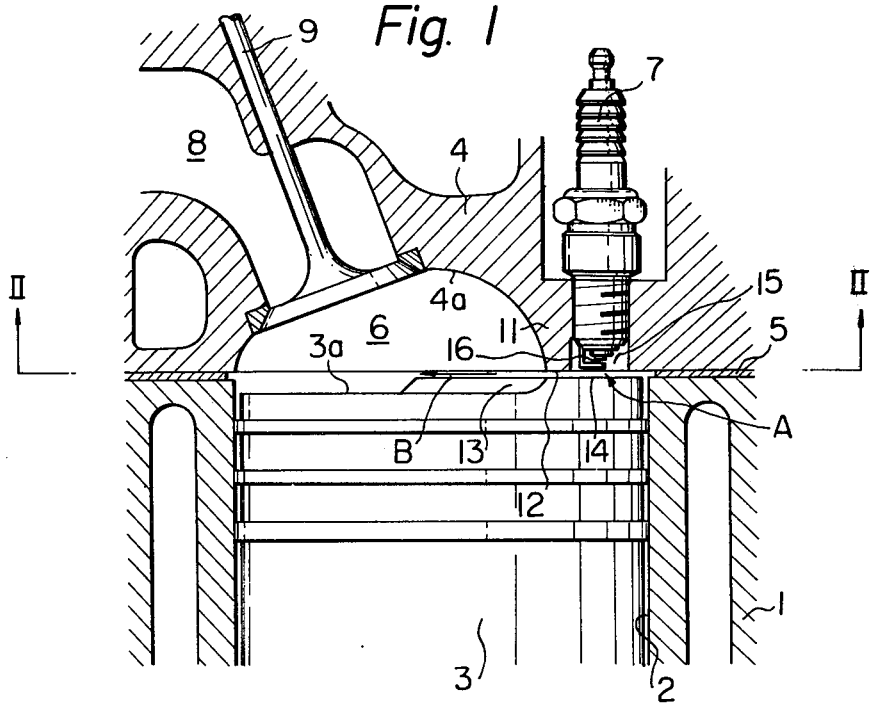
FIG. 1 is a cross-sectional side view of an embodiment of an internal combustion engine according to the present invention.
Figure 2:
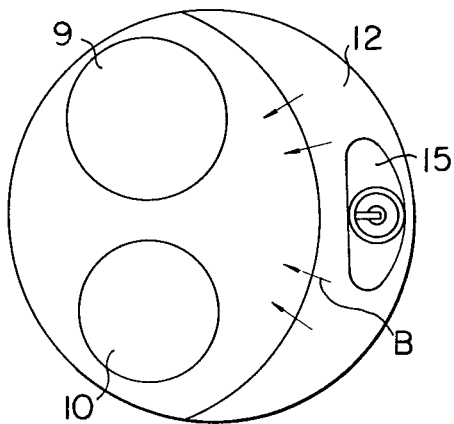
FIG. 2 is a bottom view of the cylinder head taken along the line II—II in FIG. 1.

FIGS. 1 and 2 show the case wherein the present invention is applied to an internal combustion engine having no auxiliary combustion chamber. Referring to FIGS. 1 and 2, 1 designates a cylinder block, 2 a cylinder bore formed in the cylinder block 1, 3 a piston reciprocally movable in the cylinder bore 2 and 4 a cylinder head fixed onto the cylinder block 1 via a gasket 5; 6 designates a combustion chamber formed between the top surface 3a of the piston 3 and the inner wall 4a of the cylinder head 4, 7 a spark plug, 8 an intake port, 9 an intake valve and 10 an exhaust valve (FIG. 2). A raised portion 11 projecting downwards is formed on the inner wall 4a of the cylinder head 4, and the lower end face of the raised portion 11 is formed in a crescent shaped flat surface 12. On the other hand, a raised portion 13 is formed on the top surface 3a of the piston 3 on the periphery of the piston 3, and the top surface of the raised portion 13 is formed in a crescent shaped flat surface 14 having the same shape as the crescent shape flat surface 12 of the raised portion 11. In addition, the raised portion 11 is so constructed that a small gap is created between the crescent shaped flat surfaces 12 and 14 when the piston 3 reaches the top dead center as shown in FIG. 1. Consequently, a crescent shape squish area A is formed between the crescent shaped flat surfaces 12 and 14 when the piston 3 reaches the top dead center. A recess 15 extending in the circumferential direction of the inner wall 4a of the cylinder head 4 is formed on the central portion of the crescent shaped flat surface 12 of the raised portion 11. The electrode 16 of the spark plug 7 is located in the recess 15.

In operation, a lean air-fuel mixture or an air-fuel mixture containing a large amount of recirculated exhaust gas therein is introduced into the combustion chamber 6 from the intake port 8, via the intake valve 9, at the time of the intake stroke. Then, the piston 3 moves upwards, and the combustible mixture in the combustion chamber 6 is ignited by the spark plug 7 before the piston 3 reaches the top dead center. The flame of the combustible mixture thus ignited propagates in the circumferential direction of the inner wall 4a of the cylinder head 4 on one hand, and also propagates towards the central portion of the combustion chamber 6 on the other hand. After this, when the piston 3 reaches the vicinity of the top dead center, combustion gas having a high temperature is pushed out from the squish area A towards the central portion of the combustion chamber 6, as is shown by the arrows B in FIGS. 1 and 2. This combustion gas pushed out from the squish area A causes the turbulence of the combustible mixture and, as a result, a turbulent burning is caused, whereby the combustion speed is quickened. In addition, in the case wherein an air-fuel mixture containing a large amount of recirculated exhaust gas therein is used, the recirculated exhaust gas is fully mixed with the air-fuel mixture in the combustion chamber 6 by the combustion gas having a high temperature and pushed out from the squish area A. As a result of this, the effectiveness of reducing the amount of $NO_x$ is improved and, at the same time, an extremely stable combustion can be obtained.

Figure 3:
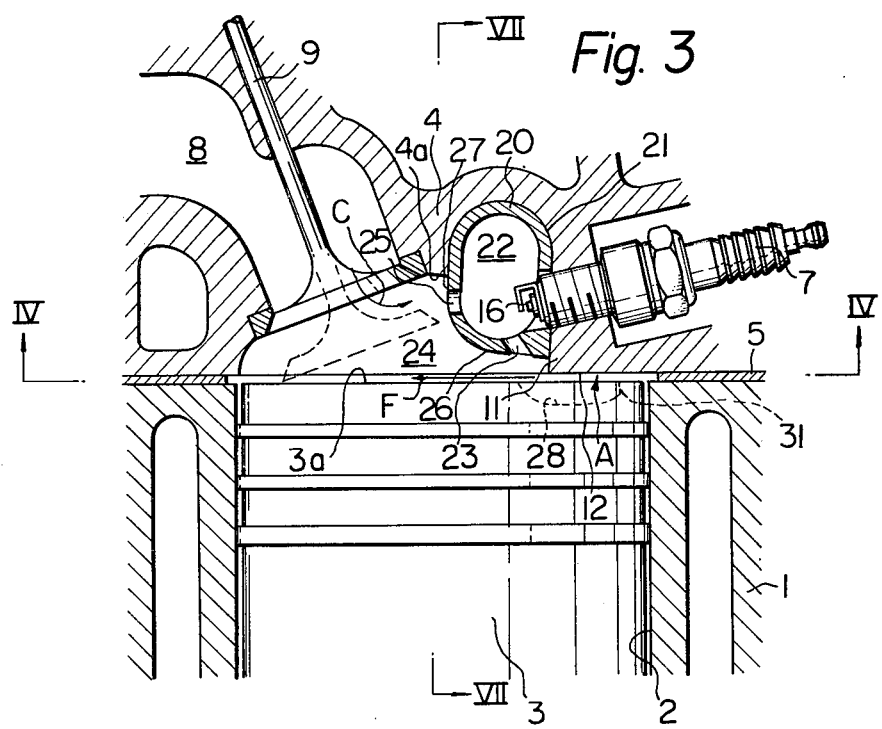
FIG. 3 is a cross-sectional side view of another embodiment according to the present invention.
Figure 4:
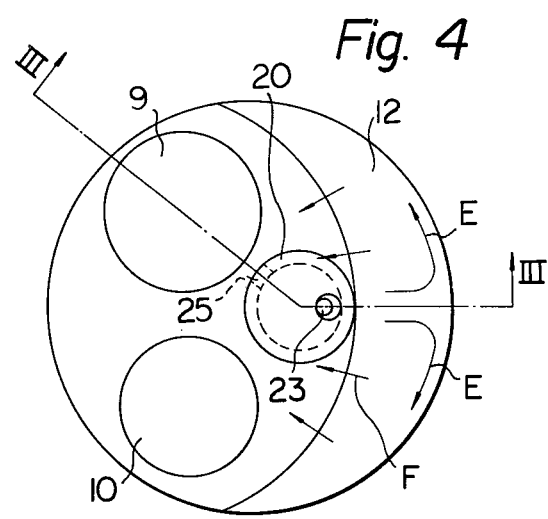
FIG. 4 is a bottom view of the cylinder head taken along the line IV—IV in FIG. 3.

FIGS. 3 and 4 show the case wherein the present invention is applied to an internal combustion engine with an auxiliary combustion chamber. In FIGS. 3 and 4, similar components are indicated with the same reference numerals as used in FIGS. 1 and 2. Referring to FIGS. 3 and 4, 20 designates an auxiliary chamber component press-fitted into a recess 21 formed in the cylinder head 4, 22 an auxiliary combustion chamber formed in the auxiliary chamber component 20, 23 a first connecting passage communicating the main combustion chamber 24 and the auxiliary combustion chamber 22, and 25 a second connecting passage communicating the main combustion chamber 24 with the auxiliary combustion chamber 22. Similar to the embodiment shown in FIG. 1, the raised portion 11 projecting downwards is formed on the inner wall 4a of the cylinder head 4, and the lower end face of the raised portion 11 is formed in a crescent shaped flat surface 12, as shown in FIG. 4. On the other hand, the top surface 3a of the piston 3 is flat. In addition, the raised portion 11 is so constructed that a small gap is created between the crescent shaped flat surface 12 of the raised portion 11 and the top surface 3a of the piston 3 when the piston 3 reaches the top dead center, as shown in FIG. 3. Consequently, when the piston 3 reaches the top dead center, a crescent shaped squish area A is formed between the crescent shaped flat surface 12 of the raised portion 11 and the top surface 3a of the piston 3.

Figure 9:
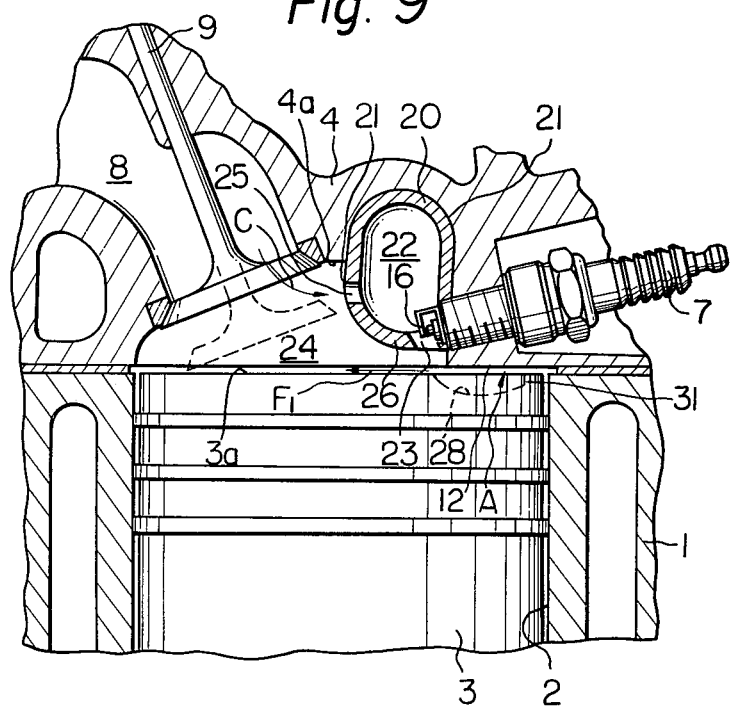
FIG. 9 is a cross-sectional side view of a further embodiment of an internal combustion engine according to the present invention.

The lower end face 26 of the auxiliary chamber component 20 is positioned slightly above the plane including the crescent shaped flat surface 12 of the raised portion 11 and is arranged so as to be approximately parallel to the above-mentioned plane. The first connecting passage 23 is arranged on the squish area side with respect to the axis of the auxiliary chamber component 20, and the opening of the first connecting passage 23 is directed to the peripheral portion of the top surface 3a of the piston 3, which defines the squish area A together with the crescent shaped flat surface 12 of the raised portion 11. The electrode 16 of the spark plug 7 is located in the auxiliary combustion chamber 22 or in the first connecting passage 23 as is shown in FIG. 9. On the other hand, the second connecting passage 25 is formed on the circumferential wall 27 of the auxiliary chamber component 20 so that the opening of the second connecting passage 25 is directed toward the valve head of the intake valve 9. The axis of the second connecting passage 25 is arranged at a skew position with respect to the axis of the first connecting passage 23 so that the combustible mixture introduced into the auxiliary combustion chamber 22 via the second connecting passage 25, at the time of the intake stroke, flows in the auxiliary combustion chamber 22 in the form of a loop and is discharged into the main combustion chamber 24 via the first connecting passage 23.

Figure 7:
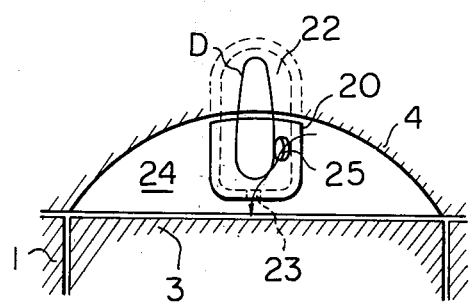
FIG. 7 is a cross-sectional side view of an internal combustion engine taken along the line VII—VII in FIG. 3.

In operation, at the time of the intake stroke, the intake valve 9 is opened, as shown by the broken line in FIG. 3, and a lean air-fuel mixture or an air-fuel mixture containing a large amount of recirculated exhaust gas therein is introduced into the main combustion chamber 24 from the intake port 8 via the intake valve 9. At this time, the flow direction of the combustible mixture introduced into the main combustion chamber 24 is deflected by the valve head of the intake valve 9, as shown by the arrow C in FIG. 3, and thus, a part of the combustible mixture is introduced into the auxiliary combustion chamber 22 via the second connecting passage 25. The combustible mixture introduced into the auxiliary combustion chamber 22 via the second connecting passage 25 flows in the auxiliary combustion chamber 22 in the form of a loop without intercrossing, as shown by the arrow D in FIG. 7, and is discharged into the main combustion chamber 24 via the first connecting passage 23. Consequently, the residual exhaust gas created by the combustion in the preceding cycle and remaining the auxiliary combustion chamber 22 is fully scavenged by the combustible mixture introduced into the auxiliary combustion chamber 22 via the second connecting passage 25. However, at this time, there is a danger that the residual exhaust gas remaining around the electrode 16 of the spark plug 7 can not be completely scavenged by the combustible mixture. Consequently, in order to avoid this danger, it is preferable that the electrode 16 of the spark plug 7 be arranged so as to be directly exposed to the combustible mixture stream forced into the auxiliary combustion chamber 22 via the first connecting passage 23 at the time of the compression stroke, as is shown in FIG. 9. In this case, the residual exhaust gas remaining around the electrode 16 of the spark plug 7 is completely scavenged at the time of the compression stroke.

At the time of the compression stroke, the combustible mixture in the main combustion chamber 24 is forced into the auxiliary combustion chamber 22 via the first and the second connecting passages 23 and 25. Then, the combustible mixture in the auxiliary combustion chamber 22 is ignited by the spark plug 7 and, as a result, burning jets are injected into the main combustion chamber 24 via the first and the second connecting passages 23 and 25. The burning jet injected from the first connecting passage 23 impinges upon the peripheral portion of the top surface 3a of the piston 3, which defines the squish area A together with the crescent shaped flat surface 12 of the raised portion 11, and then, the burning jet moves forward along the upper end of the inner wall of the cylinder bore 2 in the circumferential direction of the piston 3, as is shown by the arrow E in FIG. 4. As a result of this, the combustible mixture located between the crescent shaped flat surface 12 of the raised portion 11 and the top surface 3a of the piston 3 is immediately ignited by the burning jet. After this, when the piston 3 reaches the vicinity of the top dead center, combustion gas having a high temperature is pushed out from the squish area A towards the central portion of the main combustion chamber 24, as is shown by the arrows F in FIGS. 3 and 4. This squish flow of the combustion gas has the same function as the burning jets injected from the first and the second connecting passages 23 and 25. Consequently, as will be understood, an extremely strong burning jet is generated in the main combustion chamber 24.

Figure 5:
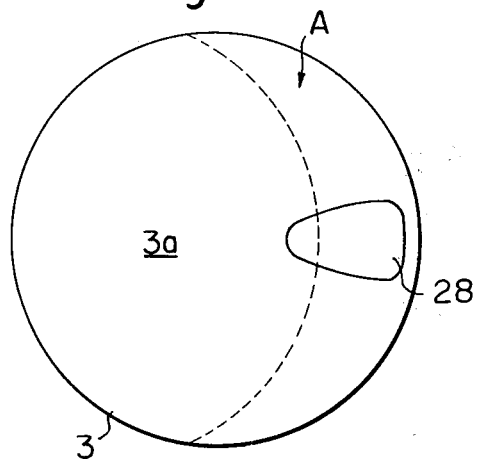
FIG. 5 is a plane view of an embodiment of the piston shown in FIG. 3 according to the present invention.
Figure 6:
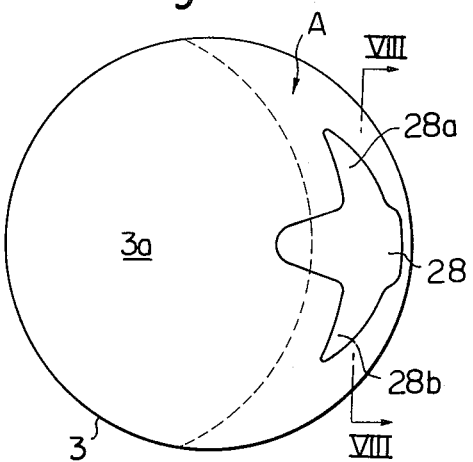
FIG. 6 is a plane view of another embodiment of the piston shown in FIG. 3 according to the present invention.
Figure 8:
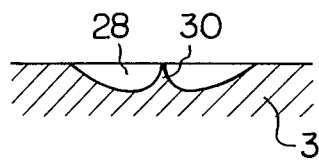
FIG. 8 is a cross-sectional view of the piston taken along the line VIII—VIII in FIG. 6.

In addition, as is shown by the broken line in FIG. 3, in order to guide the burning jet injected from the first connecting passage 23, a groove 28 having an approximately uniform depth may be formed on the top surface 3a of the piston 3. It is preferable that this groove 28 be arranged at the central portion of the squish area A, as shown in FIG. 5. In addition, as is shown in FIG. 6, groove portions 28a and 28b, extending from the groove 28 in the circumferential directions of the piston 3, may be formed on the top surface 3a of the piston 3 so that the burning jet injected into the groove 28 from the first connecting passage 23 can easily propagate in the circumferential directions of the piston 3. Furthermore, as is shown in FIG. 8, in order to positively direct the burning jet in the circumferential direction of the piston 3, a raised portion 30 functioning as a guide for the burning jet may be formed in the groove 28. While there is a danger that, if an extremely small gap is formed between the crescent shaped flat surface 12 of the raised portion 11 and the top surface 3a of the piston 3 when the piston 3 reaches the top dead center, the flame spreading over the entire space of the squish area A will be extinguished, this danger can be completely avoided by forming the groove 28 on the top surface 3a of the piston 3. In addition, as is shown by the broken line in FIG. 3, an inner wall 31 of the groove 28, which is located at a position near the peripheral edge of the piston 3, is formed as a vertical wall. By forming the inner wall 31 as a vertical wall, there is no danger that the burning jet impinging upon the bottom of the groove 28 will reach the gasket 5 and the piston rings of the piston 3. This results in preventing destruction of the gasket 5 and the piston rings.

According to the present invention, since the squish flow of the combustion gas having a high temperature causes a strong turbulence of the combustible mixture in the combustion chamber, a turbulent burning can be caused in the combustion chamber. Consequently, even if a lean air-fuel mixture or an air-fuel mixture containing a large amount of recirculated exhaust gas therein is used, the combustion speed is extremely quickened and, as a result, a stable combustion can be obtained.

While the invention has been described by reference to specific embodiments chosen for the purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a piston reciprocally movable in said cylinder bore and having a raised portion which is of substantially flat crescent shape extending radially inwardly from one side thereof;
   a cylinder head mounted on said cylinder block and having an inner substantially flat crescent shaped surface portion which is coextensive with and faces the raised portion of said piston and defines therewith an immediately closely spaced relation a narrow ignition space between said inner surface portion and the top surface of said piston when said piston reaches the top dead center position, said piston and said cylinder head defining a combustion chamber separate from and in direct fluid communication with said ignition space, means defining a recess in said inner surface portion which extends therein in a direction away from said piston;

an intake valve, movably mounted on said cylinder head, through which a combustible fuel mixture is introduced into said combustion chamber;

an exhaust valve, movably mounted on said cylinder head, for discharging exhaust gas from said combustion chamber; and ignition means in said recess for igniting the combustible mixture in said ignition space to inject a burning fuel jet from said ignition space into and towards said combustion chamber.

2. An internal combustion engine comprising:

a cylinder block having a cylinder bore therein;

a piston reciprocally movable in said cylinder bore and having a raised portion which is of substantially flat crescent shape extending radially inwardly from one side thereof;

a cylinder head on said cylinder block and having an inner substantially flat crescent shaped surface portion which is coextensive with and faces the raised portion of said piston and defines therewith an immediately closely spaced relation a narrow ignition space between said inner surface portion and the top surface of said piston when said piston reaches the top dead center position, said piston and said cylinder defining a main combustion chamber therebetween separate from and in direct fluid communication with said ignition space;

means defining an auxiliary combustion chamber in said cylinder head, said auxiliary combustion chamber defining means having a surface facing said piston and substantially parallel to said substantially flat raised portion thereof but spaced farther therefrom than said inner portion when said piston is in the top dead center position;

an intake valve, movably mounted on said cylinder head, through which a combustible fuel mixture is introduced into said main combustion chamber, said intake valve having a valve head on one end thereof;

means defining a first connecting passage directly fluidly communicating said auxiliary combustion chamber and said main combustion chamber and extending therebetween in a direction from said auxiliary combustion chamber to said main combustion chamber and toward and adjacent the radially inner end of said ignition space;

means defining a second connecting passage directly fluidly communicating said auxiliary combustion chamber and said main combustion chamber and extending therebetween in a direction from said auxiliary combustion chamber to said main combustion chamber and toward and adjacent said valve head; and an ignition means in one of said auxiliary combustion chamber and said first connecting passage for igniting the combustible mixture in said injection space to inject a burning fuel jet from said injection space into and towards said main combustion chamber.

3. An internal combustion engine as claimed in claim 2, wherein a groove is defined in said raised portion at a position whereon the burning jet injected from said first connecting passage into said main combustion chamber directly impinges.

4. An internal combustion engine as claimed in claim 3, wherein said groove has a vertical side wall arranged at a position near the peripheral edge of the raised portion of said piston.

5. An internal combustion engine as claimed in claim 3, wherein said groove extends in the circumferential direction of the raised portion of said piston.

6. An internal combustion engine as claimed in claim 3, wherein a central peak portion is formed in said groove for guiding the burning jet in the circumferential direction of the raised portion of said piston.

* * * * *